United States Patent [19]

Brown

[11] Patent Number: 4,473,277

[45] Date of Patent: Sep. 25, 1984

[54] ANTI-GLARE DEVICE AND METHOD

[75] Inventor: John W. Brown, New Hope, Pa.

[73] Assignee: Qantix Corporation, Flemington, N.J.

[21] Appl. No.: 400,659

[22] Filed: Jul. 22, 1982

[51] Int. Cl.$^3$ ........................ G02B 27/00; G02B 27/28

[52] U.S. Cl. .................................... 350/399; 350/167; 350/276 R

[58] Field of Search .................... 350/399, 384, 276 R, 350/284, 127–128, 106, 322, 283, 167; 358/252, 95; 353/38

[56] References Cited

U.S. PATENT DOCUMENTS

| | | | |
|---|---|---|---|
| 1,610,423 | 12/1926 | Cawley | 350/394 |
| 2,200,646 | 5/1940 | Strong et al. | 350/127 |
| 2,887,566 | 5/1959 | Marks | 350/276 R |
| 2,918,670 | 12/1959 | Cusano et al. | 350/399 |
| 4,012,115 | 3/1977 | Brown | 350/106 |
| 4,165,920 | 8/1979 | Brown | 350/127 |

FOREIGN PATENT DOCUMENTS

| | | | |
|---|---|---|---|
| 1382592 | 2/1975 | United Kingdom | 350/167 |

*Primary Examiner*—William H. Punter
*Attorney, Agent, or Firm*—Lerner, David, Littenberg, Krumholz & Mentlik

[57] ABSTRACT

An anti-glare device for a transmission screen includes a layer of transparent material having a front surface and a back surface. The front surface is provided with a saw-toothed profile, while the back surface is bonded to a circular polarizer. By mounting the anti-glare device a predetermined distance in front of a transmission screen, glare due to ambient light can be substantially eliminated without producing echo images.

11 Claims, 4 Drawing Figures

ANTI-GLARE DEVICE AND METHOD

FIELD OF THE INVENTION

The present invention relates to transmission screens or displays, and, more particularly, to an anti-glare device which is adapted to be positioned in front of a transmission screen so as to reduce glare due to ambient light without producing objectionable echo images. As used herein the term "tranmission screen" shall include cathode ray tube displays, such as television screens, or any other rear projection system.

BACKGROUND OF THE INVENTION

It is well known that materials which are thought of as transparent do, in fact, reflect some light. Therefore, glass and other transparent materials are capable of producing glare. Traditionally, transmission screens, such as television screens, have been made from glass or some other similar transparent material. As a result, a good deal of glare may be encountered in a desired viewing area due to ambient light striking the front face of the transmission screen and being reflected. For example, glare can be an especially annoying problem when viewing a television screen in a brightly lit room or when sunlight impinges on the screen.

Prior attempts have been made to eliminate or reduce undesired glare from transmission screens, such as television screens. For instance, the glare problem has been reduced by increasing the intensity of radiation from the television tube. But this, in turn, has increased the cost of the television.

Another attempted solution to the glare problem associated with television screens is disclosed in U.S. Pat. No. 2,909,770, where the front surface of the television screen is provided with a series of parallel grooves. The grooves have alternately intersecting surfaces, one ofwhich is coated with a black or light-absorbing substance, such as dull black paint, and the other of which is reflective and tilted so that ambient light can be reflected onto the light-absorbing surface and not to the desired viewing area of the television screen. However, because the screen itself must be first grooved and then coated, in specific areas, with a light-absorbing material, such as screen would be extremely difficult and expensive to manufacture.

In FIG. 1 of my U.S. Pat. No. 4,165,920, there is shown an overlay adapted for direct attachment to the viewing surface of a transmission screen, such as a television screen or an instrumentation display of an airplane. The overlay reduces front-face glare by providing the front face of the overlay with a plurality of parallel, generally horizontal ridges. Each ridge is formed from a generally horizontal surface which cooperates with an inclined surface to form a peak. The inclined surface of each ridge is arranged at a preselected angle relative to the horizontal, the angle being selected such that ambient light in front of the overlay is deflected downwardly away from the viewing area. It was found, however, that when utilizing such an overlay, the problem of echos or ghost images is created due, at least in part, to the reflection of light from the transmission screen off of the horizontal surfaces of the ridges.

Also disclosed in my U.S. Pat. No. 4,165,920 is an anti-glare overlay (see FIG. 4) which was designed to overcome the above-described echo problem. The overlay of FIG. 4 is essentially identical to the overlay of FIG. 1 except that in the overlay of FIG. 4 a coating of opaque material is applied to the upper portion of the inclined surface of each ridge to eliminate an echo of the image being viewed by blocking the transmission of the echo image reflected off of the horizontal surface of an associated ridge. In practice, it has proven difficult to apply the opaque material to the peaks of the inclined surfaces. It has also proven difficult to manufacture the peaks with a sharp point. Because the peaks therefore have a round or lenticular shape which is difficult to coat with an opaque material, light from the transmission screen is refracted by the uncoated or partially coated peaks in a number of different vertical directions, thereby creating a further echo problem.

SUMMARY OF THE PRESENT INVENTION

The problems and disadvantages of the prior art devices discussed above are overcome by the present invention which involves new and improved apparatus and method for reducing glare on a transmission screen without producing objectionable echo images. More particularly, the new and improved apparatus and method employ an anti-glare device which includes a sheet of transparent material having a substantially planar back face and a front face. The front face is provided with a plurality of parallel substantially V-shaped ridges. Each ridge terminates in a peak and cooperates with the other ridges to give the front face of the sheet of transparent material a generally saw-toothed profile designed to reflect ambient light away from a viewing area in front of the anti-glare device. A circular polarizer or an equivalent devices is attached to the back face of the sheet of transparent material so as to circularly polarize ambient light passing through the sheet of transparent material from its front face to its back face. More particularly, the circular polarizer functions such that the ambient light which has been refracted as it passes through the sheet of transparent material and then reflected back towards the polarizer from the front face of the transmission screen is prevented from passing back through the anti-glare device. Thus, the circular polarizer prevents the ambient light reflected from the transmission screen from creating undesirable front-face glare. The circular polarizer also prevents back-face glare resulting from the reflection of the ambient light as it passes through the back face of the anti-glare device.

In one embodiment, the circular polarizer is bonded to the back face of the sheet of transparent material by an adhesive. Preferably, the adhesive has the same index of refraction as the circular polarizer and the sheet of transparent material so that the ambient light is not reflected as it passes from one element of the anti-glare device to another.

In use in combination with a transmission screen, such as a cathode ray tube display or any other rear projection system, the anti-glare device is mounted a preselected distance in front of the transmission screen. The distance between the anti-glare device and the transmission screen is selected so as to diminish the intensity of transmission screen light traveling towards the anti-glare device to an extent such that echo images produced from transmission screen light by the ridges and peaks on the sheet of transparent material are not readily discernable to the naked eye of an individual in the normal viewing area. Thus, the present invention substantially eliminates glare due to ambient light without producing objectionable echo images. Positioning the anti-glare device a predetermined distance in front of the transmission screen is also advantageous because it eliminates the necessity of conforming the anti-glare device to the shape of the transmission screen, which in many instances is curved.

BRIEF DESCRIPTION OF THE DRAWING

For a more complete understanding of the present invention, reference may be had to the following description of an exemplary embodiment considered in conjunction with the accompanying drawing, in which.

DESCRIPTION OF THE EXEMPLARY EMBODIMENT

Figure 1:
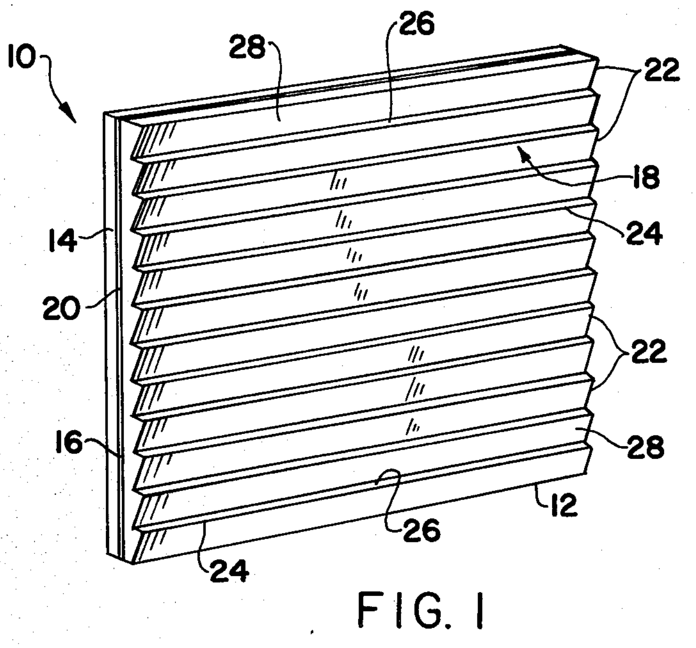
FIG. 1 is a perspective view of one embodiment of an anti-glare device constructed in accordance with the present invention.

With reference to FIG. 1, there is shown an anti-glare device 10 including a sheet of transparent material 12 and a circular polarizer 14. The sheet of transparent material 12 and the circular polarizer 14 are bonded together by an adhesive 16.

The sheet of transparent material 12, which can be glass or plastic, has a front face 18 and a back face 20. A plurality of parallel substantially V-shaped ridges 22 is provided on the front face 18 of the sheet of transparent material 12. The ridges 22, of which there are typically eighty per inch, terminate in somewhat rounded peaks 24 and cooperate to give the front face 18 a generally saw-toothed profile. Each of the ridges 22 is formed from a pair of flat surfaces 26, 28, the surface 26 being substantially perpendicular to the back face 20 of the sheet of transparent material 12 and the surface 28 being inclined outwardly with respect to the back face 20 of the sheet of transparent material 12. The back face 20 of the sheet of transparent material 12 is substantially planar.

The circular polarizer 14 can be of any suitable commercially available type, such as those sold by the Polaroid Corporation. Briefly, the circular polarizer 14 is a "sandwich" consisting of a piece of linear polarizer bonded to a quarter-wave retardation sheet oriented at an angle of 45 degrees to the transmission direction of the polarizer. The circular polarizer 14 is preferably made from a material having substantially the same index of refraction as the sheet of transparent material 12.

The adhesive 16 can be of any type suitable for permanently bonding the sheet of transparent material 12 to the circular polarizer 14. Preferably, the adhesive 16 has substantially the same index of refraction as the sheet of transparent material 12 and the circular polarizer 14 to inhibit the reflection of light at the interface between the sheet of transparent material 12 and the adhesive 16 and at the interface between the circular polarizer 14 and the adhesive 16.

Figure 2:
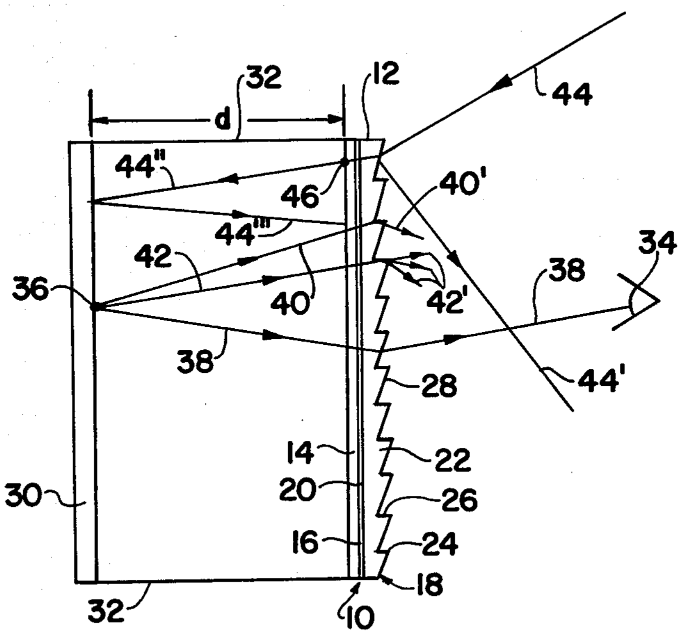
FIG. 2 is a schematic side elevational view of the anti-glare device of FIG. 1 operatively mounted in front of a transmission screen so as to reduce front-face glare without producing objectionable echo images.
Figure 3:
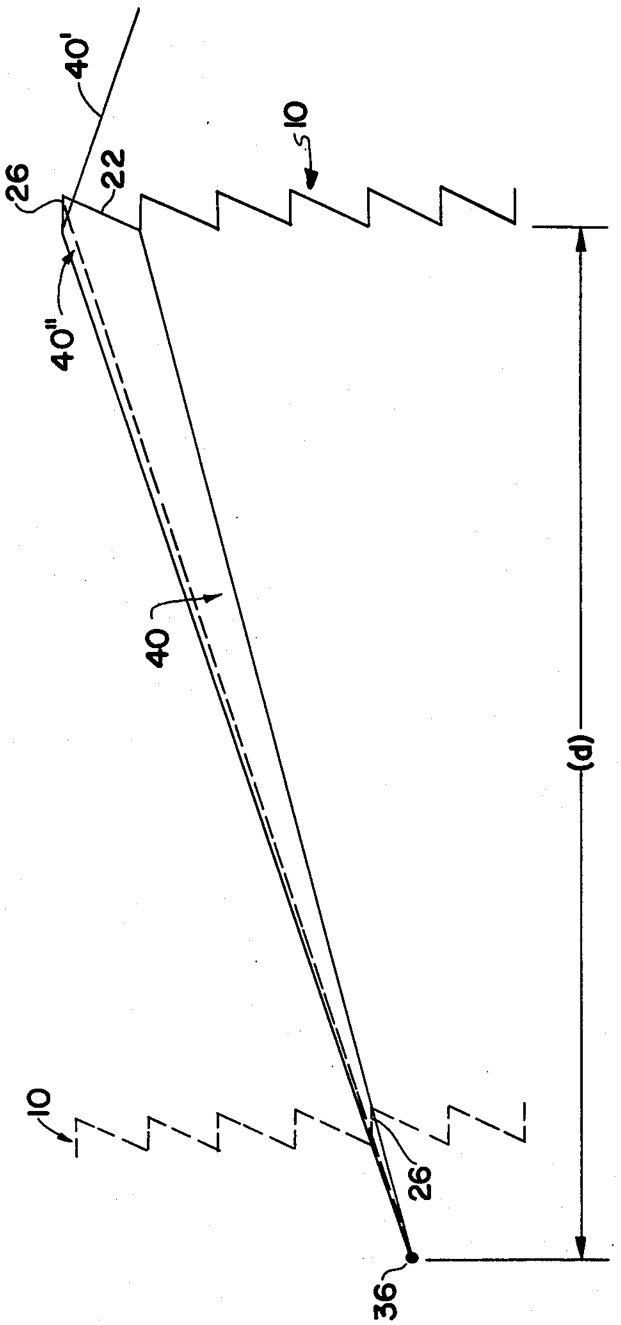
FIGS. 3 and 4 are enlarged schematic side elevational views of the anti-glare device of FIGS. 1 and 2 illustrating how the device eliminates echo images.
Figure 4:
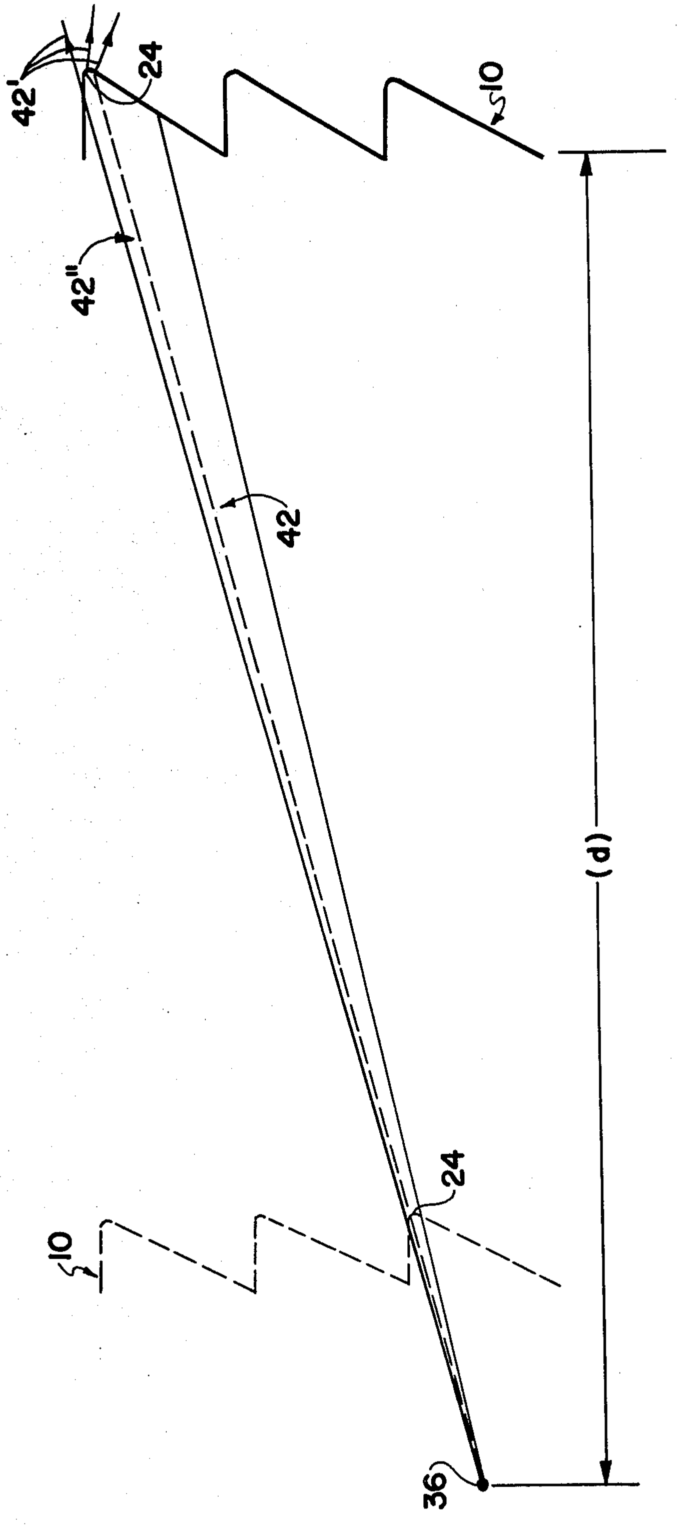

Referring now to FIG. 2, the anti-glare device 10 is vertically mounted a predetermined distance (d) in front of a transmission screen 30, such as a television screen, by brackets 32, 32 or some other suitable type of mounting system. Typically, a viewer's eye 34 is directed in a substantially horizontal direction towards an image of an object 36 on the transmission screen 30. In such an arrangement, the object 36 is viewed by a desired light beam 38 emanating from the object 36. However, light beams 40, 42 also emanate from the object 36. The light beam 40 is undesirable because it can be reflected off of the horizontal surface 26 of one of the ridges 22, thereby forming a reflected light ray 40′ directed towards the eye 34 to produce an echo image. The light beam 42 is also undesirable because it can be refracted by the peak 24 of one of the ridges 22, thereby forming refracted light rays 42′, one of which is directed towards the eye 34 to produce another echo image. The distance (d) is selected so as to diminish the intensity of the light rays 40′, 42′ to an extent such that the echo images produced by the light rays 40′, 42′ are not readily discernable to the eye 34. FIGS. 3 and 4 illustrate how the distance (d) affects the intensity of the echo images produced by the light beams 40, 42 emanating from the object 36.

Referring to FIG. 3, if the anti-glare device 10 were positioned at a location indicated in phantom in FIG. 3 (i.e., closer to the object 36 than the distance (d)), the entire light beam 40 would impinge directly upon one of the horizontal surfaces 26 of the ridges 22. When, however, the anti-glare device 10 is spaced the distance (d) from the object 36 (as indicated by the solid lines), the light beam 40 impinges over a greater area of the anti-glare device 10, so that only an upper partial beam 40″ of the light beam 40 is reflected off of one of the horizontal surfaces 26 of the ridges 22 to produce an echo image. Because of the echo image is produced from only a portion of the light beam 40, its intensity will be less than the intensity of the echo image produced when the anti-glare device 10 is positioned closer to the object 36.

With reference to FIG. 4, if the anti-glare device 10 were positioned at a location indicated in phantom in FIG. 4 (i.e., closer to the object 36 than the distance (d)), the entire light beam 42 would impinge directly upon one of the peaks 24 of the ridges 22. When, however, the anti-glare device 10 is spaced the distance (d) from the object 36 (as indicated by the solid lines), the light beam 42 impinges over a greater area of the anti-glare device 10, so that only an upper partial beam 42″ of the light beam 42 is refracted by one of the peaks 24 to produce an echo image. Because the echo image is produced from only a portion of the light beam 42, its intensity will be less than the intensity of the echo image produced when the anti-glare device 10 is positioned closer to the object 36.

Referring again to FIG. 2, a light ray 44 from a source of overhead ambient light, such as a lamp, located in front of the anti-glare device 10 impinges upon the inclined surface 28 of one of the ridges 22. The inclined surface 28 has an angle of inclination selected such that the light ray 44 is reflected and refracted by the inclined surface 28, thereby forming a reflected ambient light ray 44′ and a refracted ambient light ray 44″. The reflected ambient light ray 44′ is deflected in a generally downward direction away from the eye 34, thereby substantially reducing front-face glare produced by the ambient light. After passing through the circular polarizer 14, the refracted ambient light ray 44″, which has now been circularly polarized, impinges upon the transmission screen 30, where it is reflected back towards the anti-glare device 10 as a reflected light ray 44‴. When the reflected light ray 44‴ reaches the anti-glare device 10, the circular polarizer 14 blocks the transmission of the light ray 44''' back through the anti-glare device 10, thereby all but eliminating front-face glare produced by the ambient light. The ambient light ray 44 is also reflected at a location 46 where the light ray 44 leaves the anti-glare device 10. The resulting reflected ray (not shown), which has already been circularly polarized by the circular polarizer 14, will be blocked by the circular polarizer 14 as it travels back towards the eye 34. Thus, the anti-glare device 10 reduces front-face and back-face glare due to ambient light without producing objectionable echo images.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

I claim:

1. A system for reducing glare due to ambient light impinging upon a transmission screen, comprising an anti-glare device including a sheet of transparent material having a substantially planar back face and a front face, said front face including a plurality of parallel substantially V-shaped ridges, each of said ridges terminating in a peak and cooperating with the other of said ridges to give said front face a generally saw-toothed profile designed to reflect ambient light away from a viewing area in front of said sheet of transparent material, and inhibiting means attached to said back face of said sheet of transparent material for inhibiting the passage of ambient light which has passed through said sheet of transparent material from said front face thereof to said back face thereof and for inhibiting the passage of the ambient light which, after passing through said inhibiting means, is subsequently reflected from the transmission screen back towards said sheet of transparent material, whereby ambient light which has been refracted as its passes through said anti-glare device and is then reflected back towards said anti-glare device is inhibited from passing back through said anti-glare device to thereby inhibit ambient light reflected from the transmission screen from creating front face glare, and mounting means for mounting said anti-glare device a distance in front of the transmission screen, said distance being selected so as to diminish the intensity of transmission screen light traveling towards said anti-glare device to an extent such that echo images produced from transmission screen light by said ridges and peaks on said sheet of transparent material are not readily discernable to the naked eye of an individual in said viewing area, said inhibiting means also inhibiting back-face glare resulting from the passage of ambient light through said anti-glare device, whereby said anti-glare device substantially eliminates glare due to ambient light without producing objectionable echo images.

2. A glare reducing system according to claim 1, wherein each of said ridges includes a first flat surface substantially perpendicular to said back face of said sheet of transparent material and a second flat surface inclined outwardly with respect to said back face of said sheet of transparent material and cooperating with said first surface to form a corresponding one of said peaks.

3. A glare reducing system according to claim 2, wherein said ridges extend generally horizontally across said front face of said sheet of transparent material.

4. A glare reducing system according to claim 2, wherein said second surfaces are inclined at an angle selected so that ambient light is reflected generally downwardly away from said viewing area.

5. A glare reducing system according to claim 1, wherein said polarizing means includes a circular polarizer.

6. A glare reducing system according to claim 5, wherein said sheet of transparent material and said circular polarizer have the same index of refraction.

7. A glare reducing system according to claim 6, wherein said circular polarizer is bonded to said back face of said sheet of transparent material by an adhesive having the same index of refraction as said circular polarizer and said sheet of transparent material.

8. A glare reducing system according to claim 1, wherein said mounting means removably mounts said anti-glare device in front of a cathode ray tube display.

9. A method for reducing glare due to ambient light impinging upon a transmission screen by employing an anti-glare device including a sheet of transparent material having a substantially planar back face and a front face, said front face including a plurality of parallel substantially V-shaped ridges, each of said ridges terminating in a peak and cooperating to give said front face a generally saw-toothed profile designed to reflect ambient light away from a viewing area in front of said sheet of transparent material, and inhibiting means attached to said back face of said sheet of transparent material for inhibiting the passage of ambient light which has passed through said sheet of transparent material from said front face thereof to said back face thereof and for inhibiting the passage of the ambient light which, after passing through said inhibiting means, is subsequently reflected from the transmission screen back towards said sheet of transparent material, whereby ambient light which has been refracted as it passes through said anti-glare device and is then reflected back towards said anti-glare device is inhibited from passing back through said anti-glare device to thereby inhibit ambient light reflected from the transmission screen from creating front-face glare, said method comprising the step of mounting said anti-glare device a distance in front of the transmission screen, said distance being selected so as to diminish the intensity of transmission screen light traveling towards said anti-glare device to an extent such that echo images produced from transmission screen light by said ridges and peaks on said sheet of transparent material are not readily discernable to the naked eye of an individual in said viewing area, whereby said inhibiting means also inhibits back-face glare resulting from the passage of ambient light through said anti-glare device to thereby substantially eliminate all glare due to ambient light without producing objectionable echo images.

10. A method of reducing glare according to claim 9, wherein said anti-glare device is removably mounted in front of a cathode ray tube display.

11. A method of reducing glare according to claim 9, wherein ambient light which has been refracted as it passes through said anti-glare device and is then reflected back towards said anti-glare device is circularly polarized so as to inhibit its passage back through said anti-glare device.

* * * * *

UNITED STATES PATENT AND TRADEMARK OFFICE

CERTIFICATE OF CORRECTION

PATENT NO. : 4,473,277

DATED : September 25, 1984

INVENTOR(S) : JOHN W. BROWN

It is certified that error appears in the above-identified patent and that said Letters Patent are hereby corrected as shown below:

Column 1, line 38, change "ofwhich" to --of which--;

Column 2, line 32, change "devices" to --device--;

Column 6, line 8, change "polarizing" to --inhibiting--.

Signed and Sealed this

*Sixteenth* Day of *April 1985*

[SEAL]

*Attest:*

DONALD J. QUIGG

*Attesting Officer* *Acting Commissioner of Patents and Trademarks*